(12) United States Patent
Pechanec et al.

(10) Patent No.: US 8,978,015 B2
(45) Date of Patent: Mar. 10, 2015

(54) SELF VALIDATING APPLICATIONS

(75) Inventors: Jirí Pechanec, Mokra-Horakov (CZ);
Martin Večeřa, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 310 days.

(21) Appl. No.: 13/210,104

(22) Filed: Aug. 15, 2011

(65) Prior Publication Data

US 2013/0047036 A1 Feb. 21, 2013

(51) Int. Cl.
G06F 9/44 (2006.01)
G06F 11/36 (2006.01)

(52) U.S. Cl.
CPC .................................. *G06F 11/3672* (2013.01)
USPC ........................................... 717/126; 717/127

(58) Field of Classification Search
USPC ............... 717/124–154, 168–178; 714/37–39
See application file for complete search history.

(56) References Cited

U.S. PATENT DOCUMENTS

| | | | | |
|---|---|---|---|---|
| 5,911,041 A * | 6/1999 | Schaffer | ...................... | 714/38.13 |
| 6,725,399 B1 * | 4/2004 | Bowman | .................... | 714/38.14 |
| 7,287,242 B2 * | 10/2007 | Chang | ........................... | 717/124 |
| 7,778,968 B2 * | 8/2010 | Cherry | .......................... | 707/611 |
| 8,468,542 B2 * | 6/2013 | Jacobson et al. | .............. | 719/310 |
| 8,490,084 B1 * | 7/2013 | Alford et al. | ................... | 717/177 |
| 2003/0126517 A1 * | 7/2003 | Givoni et al. | .................... | 714/46 |
| 2003/0154275 A1 * | 8/2003 | Daase et al. | ................... | 709/223 |
| 2004/0060044 A1 * | 3/2004 | Das et al. | ....................... | 717/171 |
| 2005/0076333 A1 * | 4/2005 | Leclair et al. | .................. | 717/176 |
| 2009/0204851 A1 * | 8/2009 | Bengtsson et al. | .............. | 714/38 |

OTHER PUBLICATIONS

Andrews et al., TestingWeb applications bymodeling with FSMs, Jan. 25, 2005, Springer-Verlag, pp. 326-345.*
Subraya et al., Object driven Performance Testing of Web Applications, 2000 IEEE, pp. 17-26.*
Morla et al., Evaluating a Location-Based Application: A Hybrid Test and Simulation Environment, Published by the IEEE CS and IEEE ComSoc, 2004, pp. 48-56.*

* cited by examiner

*Primary Examiner* — Satish Rampuria
(74) *Attorney, Agent, or Firm* — Lowenstein Sandler LLP

(57) ABSTRACT

An application server operating in a production environment receives an application for deployment. A test deployer in the application server determines whether the application includes a validation test. If the application includes a validation test, the test deployer performs an auxiliary deployment of the application and runs the validation test. If the validation test succeeds, the test deployer performs a full deployment of the application on the application server.

18 Claims, 5 Drawing Sheets

SELF VALIDATING APPLICATIONS

TECHNICAL FIELD

This disclosure relates to the field of software application testing and, in particular, to self validating applications.

BACKGROUND

A computer application program (or a software program) is a sequence of instructions designed to perform a specific task on a computing device. The computing device uses programs to function, and may include a processing device to execute the programs' instructions. The computer application program may include source code, written by a software developer, which is compiled to form the executable code, which is executed by the processing device. The computer application program may implement various functions, and may include, for example, a word processing program, spreadsheet program, email program, chat program, web browser or other program. A computer application program can be used to perform any number of different tasks or functions.

The software development process is a series of steps that occur during the development of a computer application program. Some examples of the steps may include requirements, design, implementation, testing and deployment. The testing process may be designed to verify that that computer application program meets the objectives that were laid out during development, works as expected, and can provide consistent results. The testing process may use a test suite which is a collection of test cases that are intended to be used to test the computer application program to show that it has some specified set of behaviors. The testing process is used to verify that the computer application program is free of errors and other defects and will function properly. Testing is generally completed before the computer application program is deployed to a production environment.

Although most computer application programs are thoroughly tested before deployment, it is possible that the production environment (i.e., the system configuration where the computer application program will ultimately be used by a user) may introduce new bugs or errors that were not present in the test environment. The conventional testing process has no way of detecting or anticipating these errors.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for self validating applications. In one embodiment, an application server receives an application for deployment. A test deployer in the application server determines whether the application includes a validation test or tests. The validation tests may be stored in an application archive associated with the application and may be a subset of a full application test suite. If the application includes a validation test, the test deployer performs an auxiliary deployment of the application and runs the validation test. The validation test may be designed to test some basic functionality of the application. If the validation test succeeds, the test deployer undeploys any previous version of the application that was installed on the application server and performs a full deployment of the new application (or new version of the application). If the validation test does not succeed (i.e., the application encounters some error), the test deployer generates an error message and reports the error to a user.

The self validating application is able to verify that it will function properly in the production environment. This verification occurs outside the conventional testing process, which enables the application to verify its functionality while accounting for differences between the testing and production environments. Self validating applications allow for verification before uninstalling a previous version of the application already running on the application server. This potentially saves significant time and resources, as the cost of fixing an error in a computer application program increases considerably after full deployment of the program in the production environment.

Figure 1:
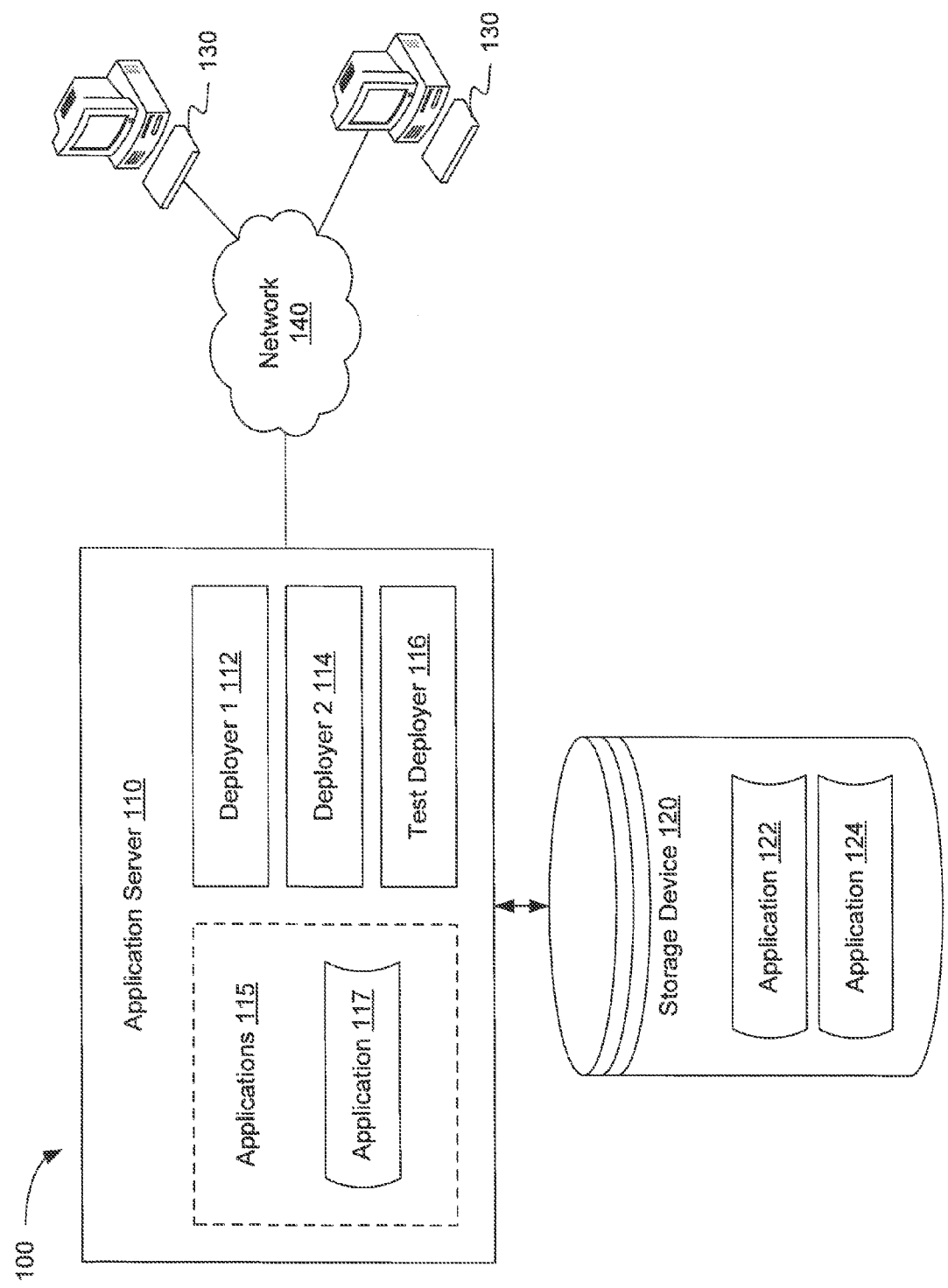
FIG. 1 is a block diagram illustrating a computing environment for deploying a self validating application, according to an embodiment.

FIG. 1 is a block diagram illustrating a computing environment for deploying a self validating application, according to an embodiment of the present invention. In one embodiment, network environment 100 includes application server 110, storage device 120, and one or more client devices 130. Client devices 130 may be used by a user to access application server 110 and any applications running thereon. Client devices 130 may be connected to application server 110 through a network 140, which may be, for example, a local area network (LAN), a wide area network (WAN), a global area network (GAN) such as the Internet, or a combination of such networks. In another embodiment, each client device 130 may have a direct connection to each of the other devices in the network. The illustrated embodiment shows one application server 110 and two client devices 130, however, in other embodiments, there may be any number of application servers 110 or client devices 130, and environment 100 may include additional and/or different devices.

Figure 5:
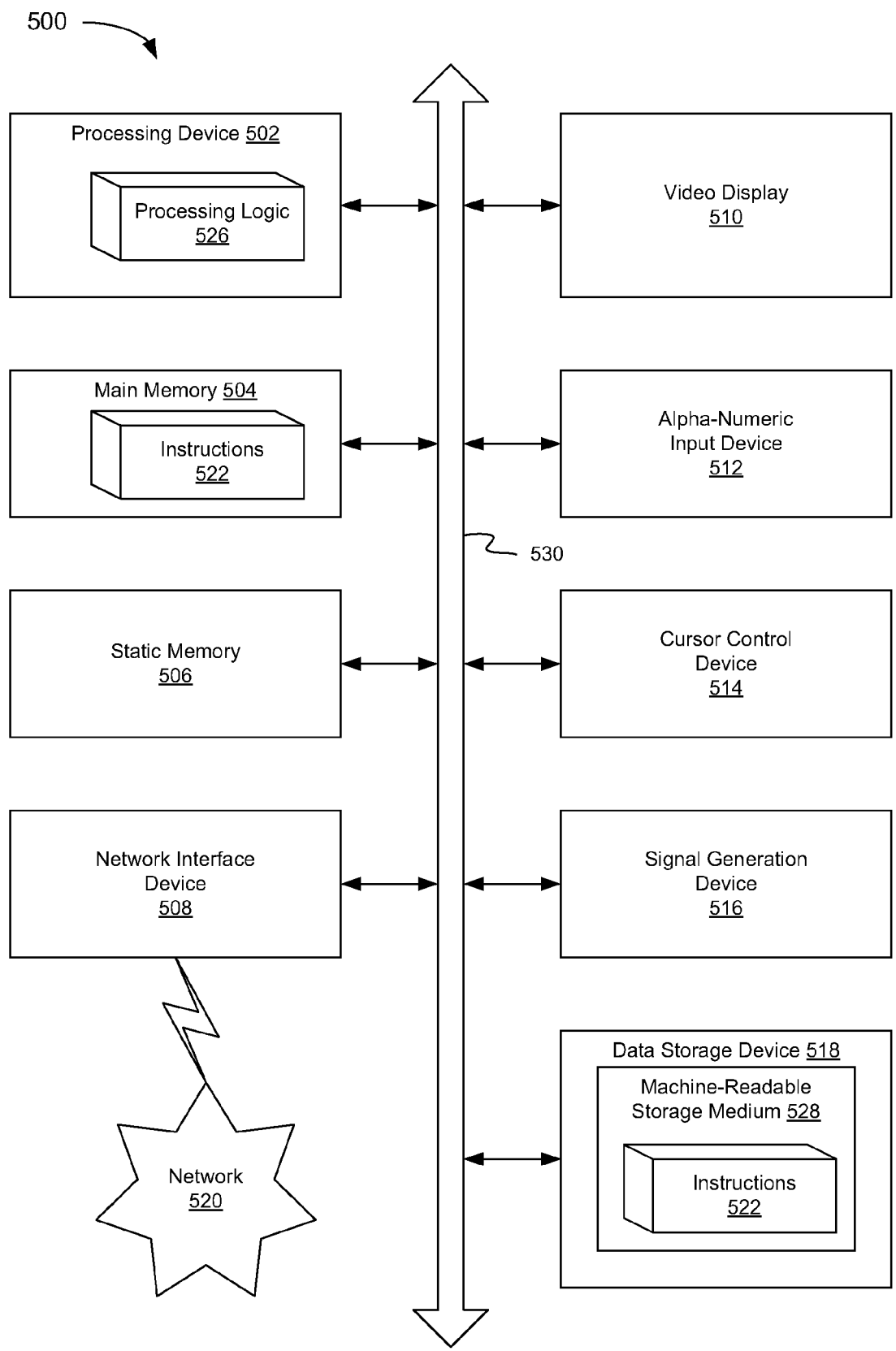
FIG. 5 is a block diagram illustrating one embodiment of a computer system, according to an embodiment.

In one embodiment, application server 110 may be a computing device, such as computer system 500 of FIG. 5. Application server 110 may include one or more applications 115, such as application 117, and one or more application deployers 112, 114, 116. Application 117 may be a computer application program designed to implement the functionality of a word processing program, spreadsheet program, email program, chat program, web browser or other program. The applications 115 running on application server 110 may provide this or other functionality to the users of client devices 130.

Deployers 112, 114, 116 may perform the activities of the deployment step of the software development process. These activities may include, among others, release, installation and activation, adaptation, updating, and deactivation or undeployment. The release activity may include operations to prepare the application for assembly and transfer to a customer, such as determining the resources required to operate in the production environment and collecting information for carrying out subsequent activities in the deployment process. Activation may include launching the executable component of the computer application program. Adaptation may include modifying a previously installed computer application program. Adaptation is generally initiated by local events rather than by the software developer. Updating may include replacing an earlier version of all or part of the computer application program with a newer version. The new version may include, for example, bug fixes, new features, etc. Deactivation may include stopping any executing components of the computer application program, which may be necessary to perform other deployment activities, such as updating.

Deployers 112, 114, 116 may be java classes configured to perform a deployment (i.e., to install and run an application) in the application server. In one embodiment, there may be multiple deployers for various deployment types. The deployment type may be recognized by the file extension, such as EAR (enterprise application), WAR (web application), JAR (enterprise java beans), SAR (internal server service), or some other extension. A deployer may registered to process specific deployment types. Multiple deployers may also be registered to process a specific deployment type. The test deployer 116 may be registered in addition to standard deployers 112, 114 of EAR and WAR archives (or any other archives). The deployers 112, 114, 116 may implement a specific interface so that when application server 110 recognizes a deployment, it looks up all necessary deployers and runs them to process the deployment. There may be an order specified in which the deployers 112, 114, 116 are used.

An application, such as applications 122, 124 may be provided by a software developer and stored in storage device 120. Storage device 120 may include mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium. Test deployer 116 may receive one of applications 122, 124 for deployment on application server 110. Upon receiving application 122 for deployment, in addition to performing any of the other deployment activities described above, test deployer 116 may determine whether the application 122 includes a validation test. Application 122 may include one or more validation tests designed to verify the functionality of the application in the production environment. The validation tests may be stored, for example, in an application archive associated with the application 122. If application 122 includes a validation test, test deployer 116 may perform an auxiliary deployment of the application 122 and run the validation test(s). During the auxiliary deployment, rather than uninstalling (or undeploying) any previous version of the application 122, test deployer installs the new version of application 122 and keeps the previous version until the validation tests are complete.

If the validation test or tests succeed, test deployer 116 may perform a full deployment of application 122 making application 122 one of the applications 115 running on application server 110 and available to client devices 130. The full deployment may include uninstalling any previous version of the application 122 running on application server 110. If the validation test does not succeed, test deployer 116 may generate an error message and report the error to a user or system administrator. In addition, test deployer 116 may remove the auxiliary deployment of application 122 from application server 110. Additional details of test deployer 116 will be provided below.

Figure 2:
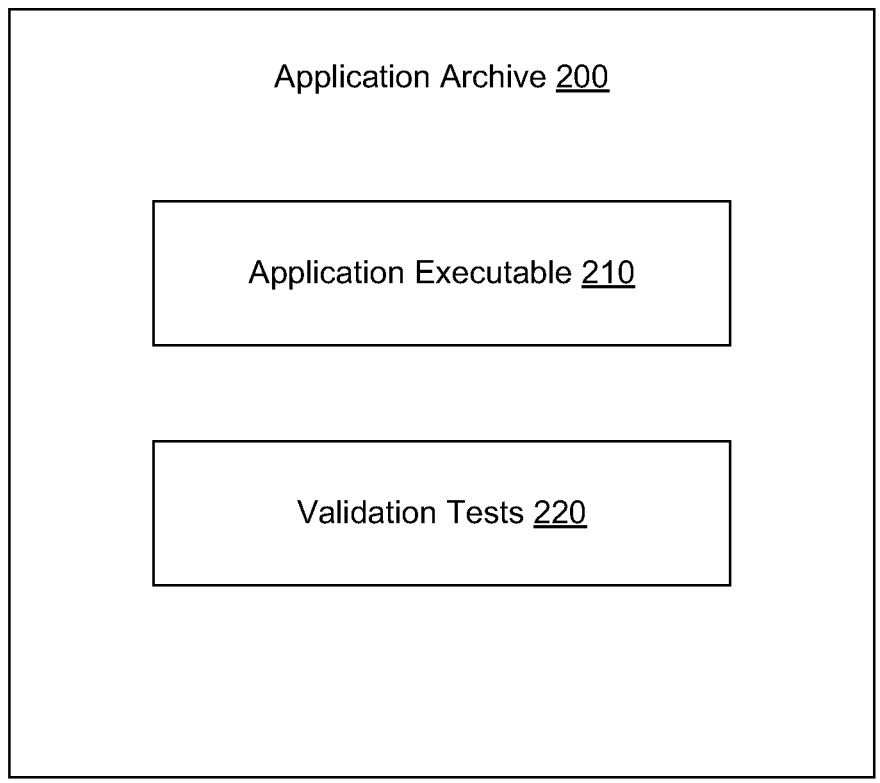
FIG. 2 is a block diagram illustrating a self validating application archive, according to an embodiment.

FIG. 2 is a block diagram illustrating a self validating application archive, according to an embodiment. Application archive 200 may be an archive file composed of one or more files along with metadata that can include information about the software classes contained in the archive 200. In one embodiment, self validating application archive 200 may include application executable file 210 and validation tests 220. Application executable file 210 may include the compiled source code to cause a computing device to perform certain tasks according to the encoded instructions. The executable file 210 may be representative of one of applications 117, 122 or 124, as discussed above. Application archive 200 may be stored, for example, on storage device 120.

Application archive 220 may be, for example, a web application archive (WAR) file, an enterprise archive (EAR) file, or some other type of file. These archives package multiple files and/or software modules together so that they may easily be deployed to an application server together. In one embodiment, the archive 200 may include one or more validation tests 220 designed to verify the functionality of the instructions in the application executable file 210. Validation tests 220 may include one or more test classes used to create instances of the validation tests. The test classes may include a series of instructions and/or pieces of data used to carry out a specific operation which makes up the validation test 220. In one embodiment, the validation tests 220 may be a representative subset of the normal test suite used to validate the computer application program during the development process. One difference is that validation tests 220 are performed in the production environment, while the normal test suite is used in a test or development environment. Differences in the system configurations in the two environments may cause the application executable file 210 to behave differently. In addition, while the normal test suite may take a relatively long amount of time to complete, the validation tests 220 are designed to be completed in a short amount of time (e.g., a matter of minutes) so as not to unnecessarily delay the deployment process.

The validation tests 220 included in application archive 200 may be selected by the software developer or may be randomly selected from the available tests in the normal test suite. In one embodiment, the validation tests 220 may be implemented using the JUnit 4 framework. JUnit 4 is a unit testing framework for the Java programming language. In other embodiment, the TestNG framework or some other unit testing framework may be used. The validation tests 220 may be designed to verify some relatively simple operation of the application executable 210, with the assumption being made that if that operation functions properly, the rest of the instructions will also function as intended. For example, if the computer application program is a an email program, one of the validation tests may be sending a sample email to a test address. Test deployer 116 may verify that the email was sent successfully, and if so, proceed with the full deployment of the email program. In another example, if the computer application program is a database program, the validation test may include reading a particular entry from the database. In general, the validation test 220 will be specifically tailored to the basic functionality of the computer application program. Thus, the validation test 220 may test potentially any different functionality. The validation test 220 may be discovered, performed, and evaluated by test deployer 116 of application server 110.

Figure 3:
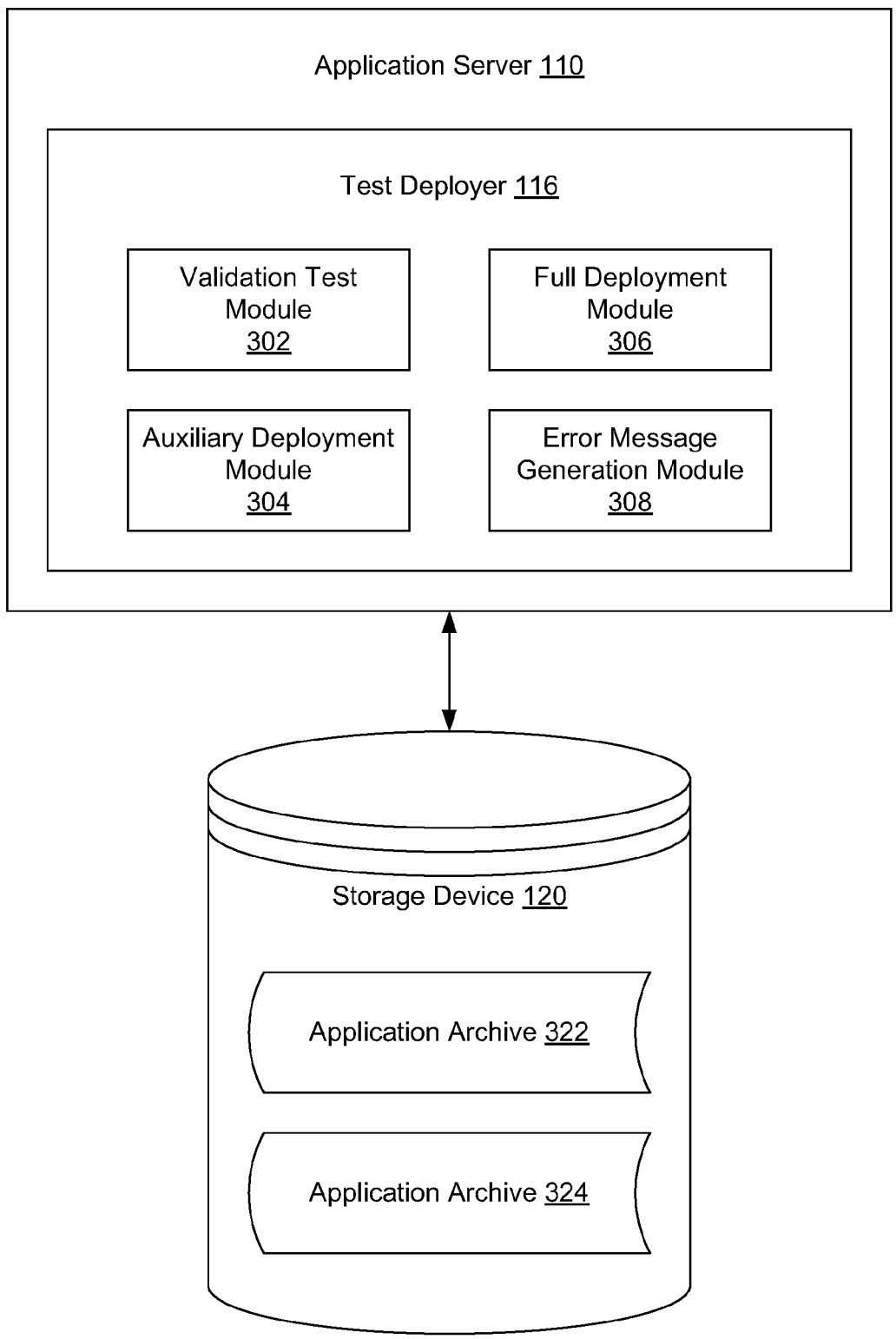
FIG. 3 is block diagram illustrating a test deployer for self validating applications, according to an embodiment.

FIG. 3 is block diagram illustrating a test deployer for self validating applications, according to an embodiment of the present invention. In one embodiment, test deployer 116, which may run in application server 110, includes validation test module 302, auxiliary deployment module 304, full deployment module 306 and error message generation module 308. Application server 110 may be coupled to a storage device 120 which includes application archives 322 and 324. In one embodiment, application archives 322 and 324 may be representative of an application archive, such as application archive 200, as discussed above.

Test deployer 116 may be used to deploy one or more of the applications associated with application archives 322 and 324 on application server 110 and to verify that the applications will function as intended. In one embodiment, upon receiving application archive 322 to deploy, validation test module 302 determines whether the application archive 322 includes a validation test, such as validation test 220. Validation test module 302 may scan each of the classes in application archive 322, and those test classes may be marked with an indication in the metadata identifying them as validation tests. If validation test module 302 identifies a validation test 220 in the application archive, auxiliary deployment module 304 may perform an auxiliary deployment of the application. During the auxiliary deployment, the new application from application archive 322 is installed in application server 110 and any previous version of the application remains installed on the application server 110.

Upon the auxiliary deployment being performed, validation test module 302 runs the validation test 220. Validation test module 302 may execute the instructions, using any provided data, from the validation test 220 to verify an operation of the application. When the operation is performed, validation test module 302 may monitor the operation and compare the result to an expected result from the test class of validation test 220. If the actual result matches the expected result, meaning that the validation test succeeded, full deployment module 306 may perform a full deployment of the application. The full deployment may include removing any previous versions of the application from application server 110. If the validation test did not succeed (i.e., the actual result did not match the expected result), error message generation module 308 may generate an error message and report the error to a user. The error message may be displayed to a user, for example, on client device 130, or may be otherwise conveyed to the user, system administrator, software developer, or other person. The error message may include specific details about the timing, cause, and results of the error, to enable the user to develop a fix for the error. In one embodiment, the test results and error message may be stored using a managed bean (MBean), and Entity Bean, a shared file system, or other software construct. An MBean is a software class in the Java programming language that is used to encapsulate many objects into a single object, so that it can be transferred as a single bean object instead of multiple individual objects. An Entity Bean is an Enterprise JavaBean (EJB) that represents persistent data maintained in a database. In addition, error message generation module 308 may instruct auxiliary deployment module 304 to remove the auxiliary deployment of the application from application server 110.

Figure 4:
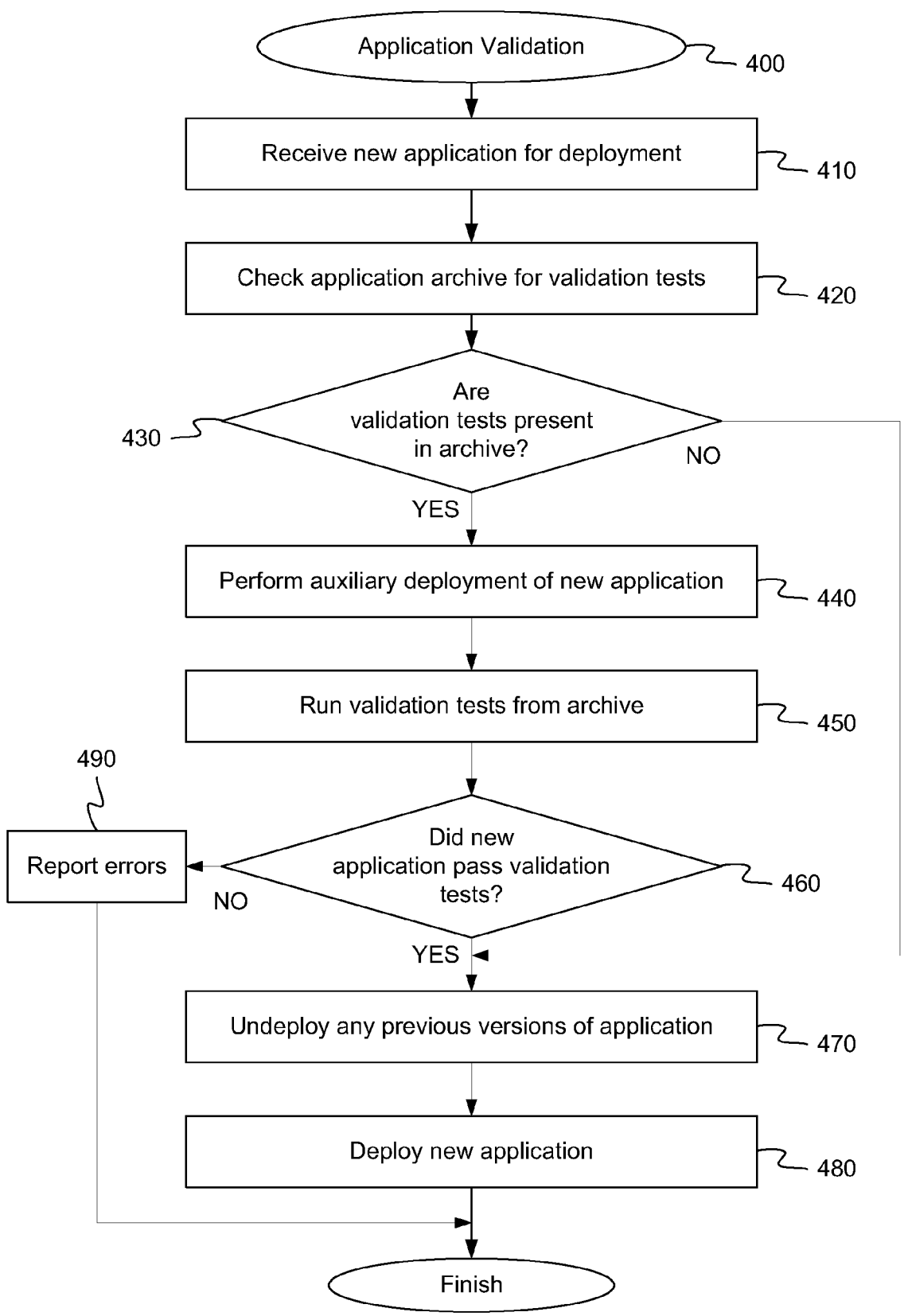
FIG. 4 is a flow diagram illustrating an application validation method, according to an embodiment.

FIG. 4 is a flow diagram illustrating an application validation method, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to allow a computer application program to self-validate, outside of the conventional testing process. In one embodiment, method 400 may be performed by test deployer 116, as shown in FIGS. 1 and 3.

Referring to FIG. 4, at block 410, method 400 receives a new application for deployment. The application be provided by a software developer, system administrator or other source. In one embodiment, the new application is stored on a storage device 120 and provided to application server 110, where it is received by test deployer 116. At block 420, method 400 checks an application archive 200 associated with the new application for validation tests 220. Validation test module 302 of test deployer 116 may scan all of the classes in archive 200 to identify any test classes containing the validation tests 220.

At block 430, method 400 determines whether one or more validation tests 220 are present in the application archive 200. The test classes may be identified by a specific identifier contained in metadata stored with each class. If at block 430, method 400 determines that there are not any validation tests in the archive, method 400 proceeds to block 470. The operations at block 470 are described below.

If at block 430 method 400 determines that there are one or more tests in the application archive, at block 440, method 400 performs an auxiliary deployment of the new application. Auxiliary deployment module 304 of test deployer 116 may install the new application on application server 110 without removing any previous versions of the application that may be running on the application server 110. At block 450, method 400 runs the validation test or tests 220 from the application archive 200. Validation test module 302 may run the tests by executing instructions and/or using data contained in the test class. The validation test 220 may include one or more operations to verify some basic functionality of the computer application program in the production environment.

At block 460, method 400 determines if the new application passed the validation tests (i.e., if the validation test succeeded). Validation tests module 302 may compare a result of the validation test 220 to an expect result for the test. If the results match, the validation test 220 is said to have succeeded. If at block 460, method 400 determines that the validation test succeeded, at block 470, method 400 undeploys any previous versions of the application that are installed on the application server, and at block 480, method 400 performs a full deployment of the new application on the application server. Auxiliary deployment module 304 may uninstall the previous version of the application while full deployment module 306 completes deployment of the new version on application server 110.

If at block 460, method 400 determines that the validation test did not succeed, at block 490, method 400 generates an error message and reports the error to the user. Error message generation module 308 may generate the message which may be displayed to a user, for example, on client device 130.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of an application server, such as application server 110.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-accessible storage media. The instructions 522 may further be transmitted or received over a network 520 via the network interface device 508.

The machine-readable storage medium 528 may also be used to store instructions to perform a method of validating a computer application program. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
receiving, by an application server operating in a production environment, an application for deployment, the application having an associated application archive comprising an application executable file;
determining, by a test deployer prior to installing the application executable file in the production environment, whether the application archive comprises a validation test by scanning a plurality of test classes in the application archive and marking those test classes identified as validation tests with an indication in metadata;
in response to the application archive comprising the validation test, performing, by a processing device, an auxiliary deployment of the application and running the validation test, wherein performing the auxiliary deployment comprises maintaining a previous version of the application installed on the application server while the validation test is run; and
in response to the validation test succeeding, performing a full deployment of the application on the application server.

2. The method of claim 1, further comprising:
in response to the validation test succeeding, undeploying a previous version of the application installed on the application server.

3. The method of claim 1, wherein the application archive comprises a plurality of validation tests.

4. The method of claim 3, wherein the plurality of validation tests comprises a subset of a full application test suite.

5. The method of claim 1, further comprising:
in response to the application not comprising the validation test, performing a full deployment of the application on the application server.

6. The method of claim 1, further comprising:
in response to the validation test not succeeding, generating an error message and reporting an error to a user.

7. A system comprising:
a processing device; and
a memory coupled to the processing device; and
a test deployer, executable by the processing device from the memory, to:

receive an application for deployment in a production environment, the application having an associated application archive comprising an application executable file;

determine, prior to installing the application executable file in the production environment, whether the application archive comprises a validation test by scanning a plurality of test classes in the application archive and marking those test classes identified as validation tests with an indication in metadata;

in response to the application archive comprising the validation test, perform an auxiliary deployment of the application and run the validation test, wherein to perform the auxiliary deployment, the test deployer to maintain a previous version of the application installed on the application server while the validation test is run; and in response to the validation test succeeding, perform a full deployment of the application.

8. The system of claim 7, the test deployer further to:

in response to the validation test succeeding, undeploying a previous version of the application installed on the application server.

9. The system of claim 7, wherein the application archive comprises a plurality of validation tests.

10. The system of claim 9, wherein the plurality of validation tests comprises a subset of a full application test suite.

11. The system of claim 7, the test deployer further to:

in response to the application not comprising the validation test, performing a full deployment of the application on the application server.

12. The system of claim 7, the test deployer further to:

in response to the validation test not succeeding, generating an error message and reporting an error to a user.

13. A non-transitory machine-readable storage medium storing instructions which, when executed, cause a processing device to perform operations comprising:

receiving an application for deployment in a production environment, the application having an associated application archive comprising an application executable file;

determining, by a test deployer prior to installing the application executable file in the production environment, whether the application archive comprises a validation test by scanning a plurality of test classes in the application archive and marking those test classes identified as validation tests with an indication in metadata;

in response to the application archive comprising the validation test, performing, by the processing device, an auxiliary deployment of the application and running the validation test, wherein performing the auxiliary deployment comprises maintaining a previous version of the application installed on the application server while the validation test is run; and in response to the validation test succeeding, performing a full deployment of the application.

14. The storage medium of claim 13, the operations further comprising:

in response to the validation test succeeding, undeploying a previous version of the application installed on the application server.

15. The storage medium of claim 13, wherein the application archive comprises a plurality of validation tests.

16. The storage medium of claim 15, wherein the plurality of validation tests comprises a subset of a full application test suite.

17. The storage medium of claim 13, the operations further comprising:

in response to the application not comprising the validation test, performing a full deployment of the application on the application server.

18. The storage medium of claim 13, the operations further comprising:

in response to the validation test not succeeding, generating an error message and reporting an error to a user.

* * * * *